United States Patent [19]
Spriggs et al.

[11] Patent Number: 5,262,220
[45] Date of Patent: Nov. 16, 1993

[54] HIGH STRENGTH STRUCTURE ASSEMBLY AND METHOD OF MAKING THE SAME

[75] Inventors: Donald R. Spriggs, San Diego; William G. Taft, Cardiff; Christian W. Loedel, San Diego, all of Calif.

[73] Assignee: Chem-Tronics, Inc., El Cajon, Calif.

[21] Appl. No.: 716,957

[22] Filed: Jun. 18, 1991

[51] Int. Cl.$^5$ .................. B32B 3/28; B64B 1/14
[52] U.S. Cl. .................. 428/156; 428/120; 428/166; 428/167; 428/172; 428/178; 428/213; 428/593; 428/594; 244/119; 244/125; 244/126
[58] Field of Search .......... 428/34, 156, 167, 172, 428/119, 120, 166, 178, 192, 213, 593, 594; 244/119, 125, 126; 29/DIG. 38; 228/141.1; 219/120

[56] References Cited

U.S. PATENT DOCUMENTS

| | | | |
|---|---|---|---|
| 3,533,153 | 10/1970 | Melill et al. | 29/423 |
| 4,113,549 | 9/1978 | Brimm | 156/639 |
| 4,137,118 | 1/1979 | Brimm | 156/545 |
| 4,406,393 | 9/1983 | Ascani | 228/157 |
| 4,725,334 | 2/1988 | Brimm | 156/630 |

OTHER PUBLICATIONS

Microsandwich Honeycomb/appearing SAMPE Journal, vol. 25, No. 3, May/Jun. 1989 by T. Balakrishna Bhat, Taylor Wang and Lorna Gibson.

Primary Examiner—Donald J. Loney
Attorney, Agent, or Firm—Hughes & Multer

[57] ABSTRACT

A high strength panel-like structure having a high strength to weight ratio. The structure comprises two integrally formed panel sections, each panel section comprising an outer sheet portion and inwardly extending ribs that are formed integrally with the related sheet portions, and having inner bonding surfaces spaced from their respective sheet portions. The two panel sections are formed into a unitary structure by bonding the two sections at the bonding surfaces of the ribs. Thus, the bonding area of the panel structure is at the neutral axis of the structure. Desirably inner bonding surfaces of the ribs have a width dimension greater than a width dimension of the ribs.

21 Claims, 9 Drawing Sheets

HIGH STRENGTH STRUCTURE ASSEMBLY AND METHOD OF MAKING THE SAME

The present invention relates to a high strength structure and the method of making the same, and more specifically to panel-like structures having a high strength to weight ratio for aero space application and the like.

BACKGROUND ART

In the aerospace industry and other industries with similar problems there are increasing performance demands for structural components which are light weight, have a high strength weight ratio, and for some applications which require high specific stiffness.

For many years, one of the standard structural configurations of the aircraft industry is the use of "honeycomb", where there are two outer skins, with the honeycomb core being bonded to the internal skin surfaces. Metal such as aluminum, titanium, nickel, and their alloys have been fabricated as honeycomb. Honeycomb structure is used commonly in static structures such as panels, and have also been incorporated as aircraft engine components.

However, honeycomb has certain inherent problems. For example, there is a limit to the inherent stiffness of structures made from "thin section" stitched-foil honeycomb interlayers. Such structures are expensive to fabricate from raw material to the finished part. Further, the internal configuration of honeycomb-reinforced components is difficult to inspect nondestructively with any precision. Another problem is that honeycomb structure is difficult (and as a practical matter impossible in some instances) to repair effectively.

Conventional honeycomb has two bonded areas at the surface of the skins, and these are located in highly stressed zones when there is flexural loading on the honeycomb panel. Further, the joint strength is inherently limited by the small cross-sectional area of the edges of the core members. Failure at even a small portion of the bond area can result in failure of the panel to meet its functional requirements. Also, honeycomb core properties are limited, especially in shear capabilities, due to the orientation of the honeycomb structure, the depth of the core, and the fillet width sizes of the bonding region.

Although the benefits of honeycomb structures have long been recognized, because of the difficulties or the problems such as those expressed above, there have been attempts in the prior art to form other panel structures or the like with a high strength to weight ratio. For example, in three U.S. Pat. Nos. (U.S. Pat. No. 4,113,549 issued Sept. 12, 1978, U.S. Pat. No. 4,137,118 issued Jan. 30, 1979 and U.S. Pat. No. 4,725,334 issued Feb. 16, 1988) there are disclosed panel structures having integral reinforcing ribs, where the ribs are configured with undercuts to form an T-section so as to optimize efficiency in terms of section modulus and to produce a high strength to weight ratio. Because of the ease of fabrication, superior performance and other attributes, such structures can advantageously be substituted for structures that are honeycomb or skin-and-stringer reinforced.

SUMMARY OF THE INVENTION

The present invention provides a panel like structure which has a high strength to weight ratio and which is particularly adapted for aerospace application and the like.

The present invention comprises a first integrally formed flat or contoured panel section, which comprises an outer first sheet portion that has outer and inner surfaces. This first section has a first ribbed portion that in turn comprises a plurality of first ribs arranged in a first predetermined pattern and formed integrally with the first sheet portions, with each rib having an outer first rib portion joined integrally to the first sheet portion and an inner first rib portion spaced inwardly from said first sheet portion and having an inwardly facing first bonding surface.

There is a second integrally formed flat or contoured mating panel section which comprises a second sheet portion and a second rib portion, both of which are configured similarly to the first sheet portion and first rib portion.

The first and second panel sections are positioned with the first and second bonding surfaces of the first and second ribs more or less precisely positioned against one another and metallurgically bonded to one another at bonding locations between the first and second sheet portions, so as to form a rigid structure.

As loads are imposed upon the structure so as to place the first and second skin portions in compression or tension, the bonding locations of the first and second ribs are closer to a neutral axis of the structure relative to withstanding such loads.

Other features of the invention will be apparent from the following detailed description.

DESCRIPTION OF THE PREFERRED EMBODIMENTS

Figure 10:
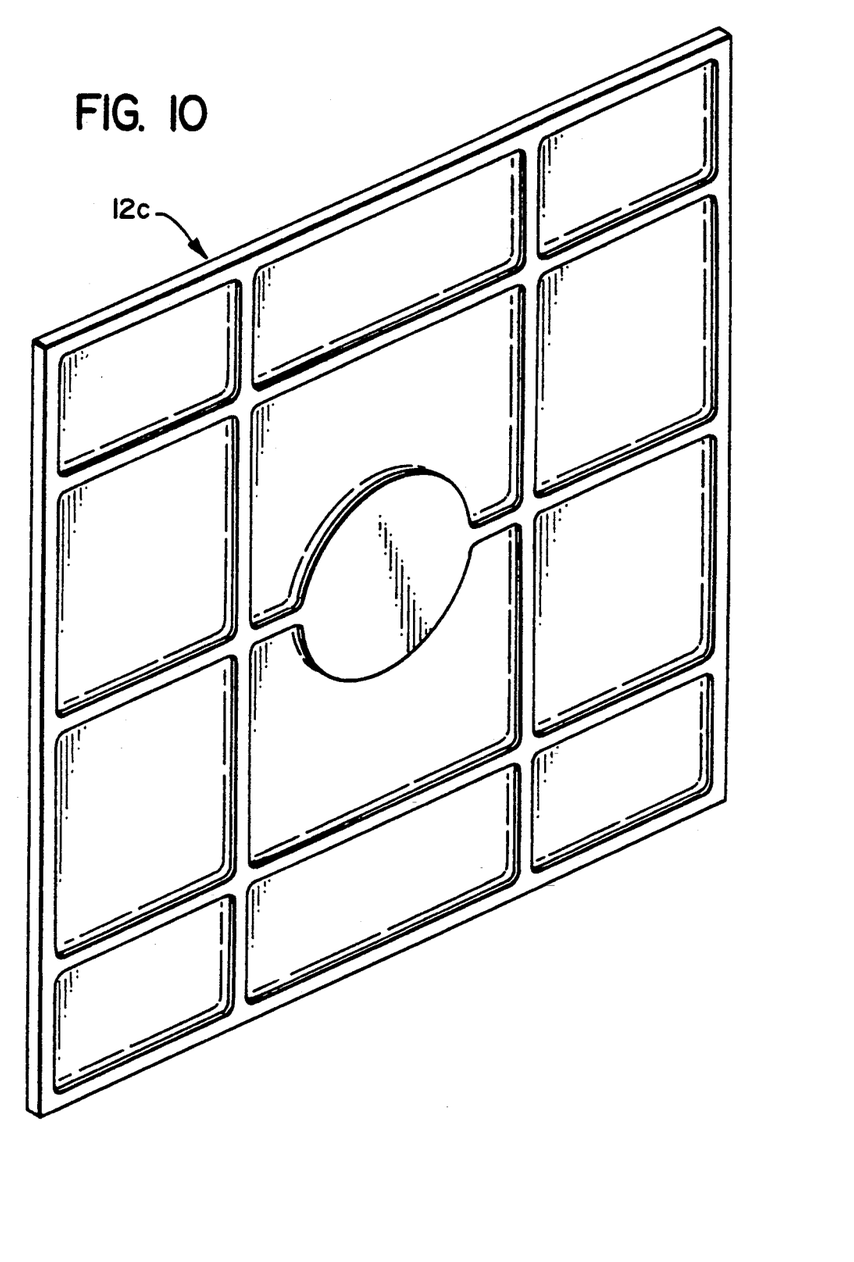
FIG. 10 is a view similar to FIG. 1, showing one panel of a fourth embodiment where an integral boss is incorporated in the panel structure.

A first embodiment of the present invention is shown in FIGS. 1 through 4. In the following description, the present invention will be described as a "panel structure", with the understanding that the concept of the present invention could be incorporated in various structures which may not properly be considered as "panels". An example of such structures is shown by FIG. 10.

Figure 1:
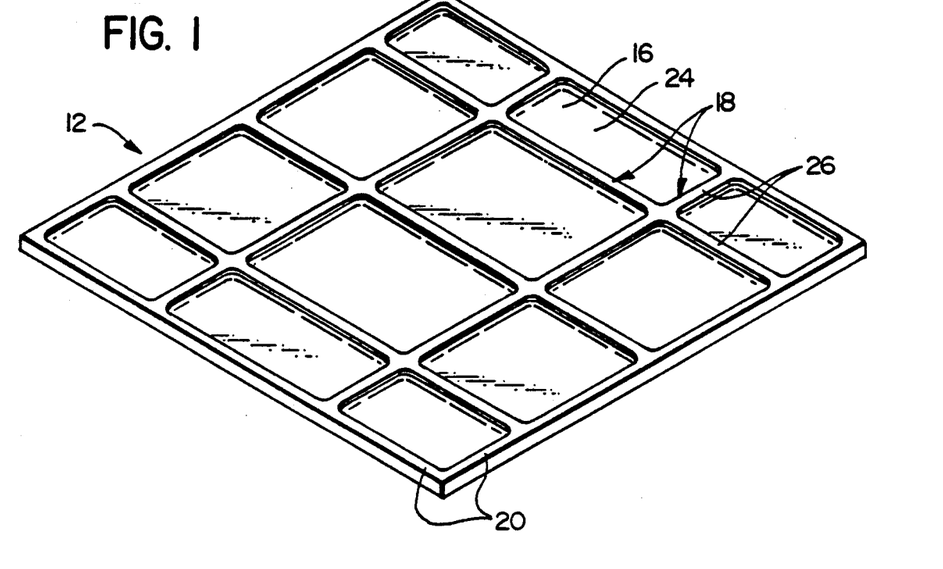
FIG. 1 is an is isometric view of a first integral panel section which is bonded to a matching panel section to form the panel structure of the present invention.
Figure 2:
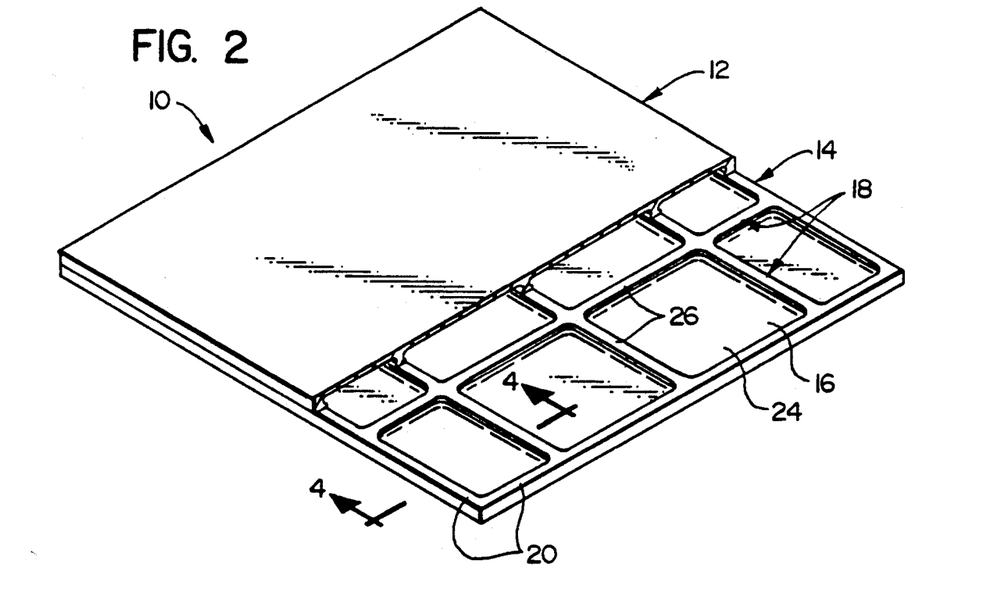
FIG. 2 is an isometric view similar to FIG. 1, and showing a second integral panel section bonded to the first panel section of FIG. 1 to form the bonded panel structure, with a portion of the second upper panel section being removed for purposes of illustration.
Figure 3:
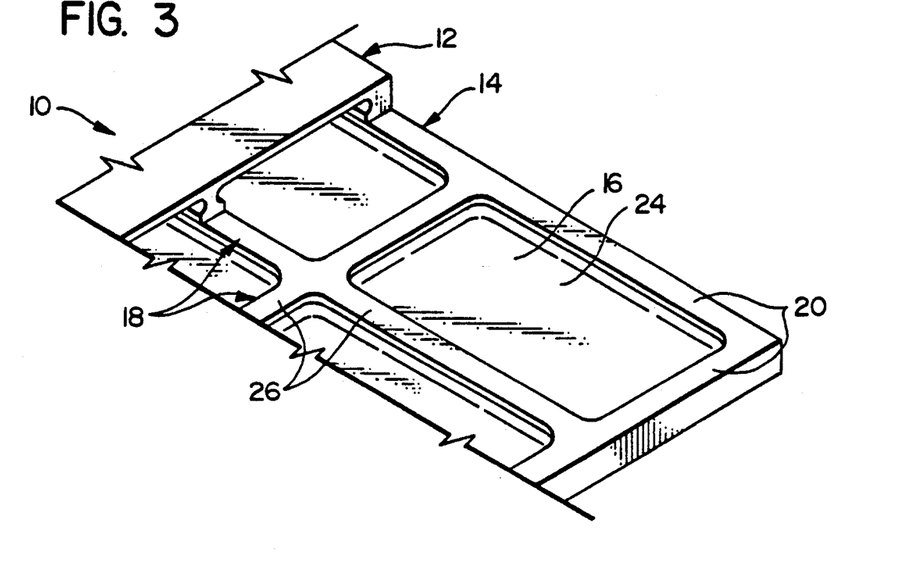
FIG. 3 is an isometric view similar to FIG. 2, but drawn to an enlarged scale and showing only one corner portion of the structure of FIG. 2.

The panel structure 10 of the present invention is made up of first and second panel sections 12 and 14 that are bonded one to another. In the particular arrangement of this first embodiment, the panel sections 12 and 14 are identical or substantially identical, so only the first panel section 12 will be described in detail.

The first panel section 12 is a single integrally formed member and for purposes of description can be considered as comprising a planar sheet portion 16, a rib portion 18, and a perimeter edge portion 20. In describing the panel 10, the term "inner" shall denote proximity to a center plane 21 parallel to the planar sheet portions 16, and the term "outer" denotes the opposite.

The planar sheet portion 16 extends continuously over the entire area of the panel section 12, and has an outer surface 22 and an inner surface 24. The rib portion 18 comprises a plurality of ribs 26, which are formed integrally with the sheet portion 16 and extend inwardly therefrom. Each rib 26 has in cross-sectional configuration (see FIG. 4) a web portion 28 which extends inwardly from the sheet portion 16 and an inner flange portion 30 at the inside edge of the web portion 28. The flange portion 30 has a flat inner bonding face 32 which is joined to corresponding bonding faces 32 of matching ribs of the second panel section 14 to form the finished panel structure 10 of the present invention.

The edge portion 20 extends entirely around the perimeter of the first panel section 12 and extends from the planar sheet portion 16 in generally the same manner as the ribs 26. In cross-sectional configuration, the edge portion 20 has an exterior perimeter flat surface 34 which in the present configuration is aligned at right angles with the outside surface 22 of the planar sheet portion 16, and also an inner flat bonding face 36, which in this preferred configuration lies in the same plane as the bonding faces 32 of the ribs 26. The interior side surface 38 of the edge portion 26 has the same general configuration as the side surfaces 40 of the ribs 26. It can readily be seen that the pattern of the arrangement and spacing of the ribs 26 and edge portion 20 of the first panel section 12 match the arrangement of the ribs 26 and edge portion 20 of the second panel 14. The panel structure 10 of the present invention is made by bonding the two panel sections 12 and 14 together by placing the bonding faces 32 and 36 of the ribs 26 and edge portions 20 of the two sections 12 and 14 against one another and bonding these to one another to form the finished panel structure 10. The particular benefits which accrue from this arrangement (and the details which account for these benefits) will be discussed in more detail later herein.

It is to be emphasized that the basic configuration of each of the panel sections 12 and 14, individually, is substantially shown in prior art U.S. Pat. No. 4,725,334. Further, the method of manufacturing each of the panel sections 12 and 14 individually is, or may be, substantially the same as that described and shown in U.S. Pat. No. 4,113,549. However, it has been found that by joining these two individual panel sections 12 and 14 together, as described herein, there are achieved functional benefits which do not exist in a single panel section and which have not been recognized in the prior art.

Figure 4:
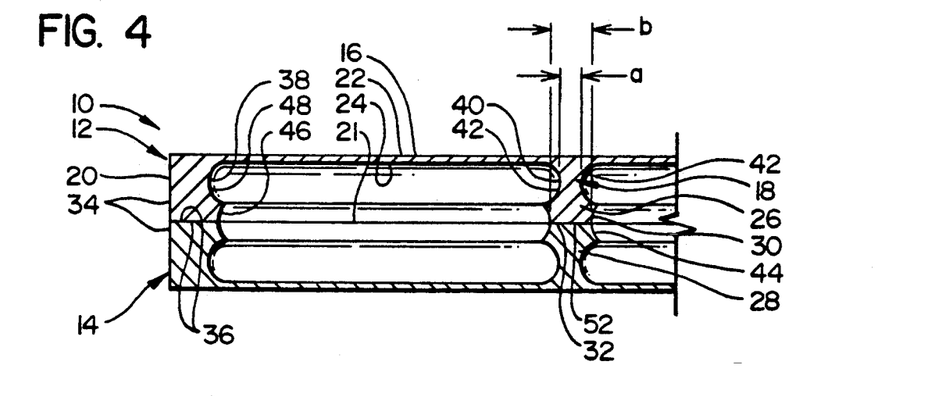
FIG. 4 is a sectional view taken along line 4—4 of FIG. 2.

Reference will now be made to FIG. 4. It will be noted that the web portion 28 of each rib has, in cross-sectional configuration, two concave side surfaces 42 having a smaller width dimension, indicated at "a". It will also be noted that the two side surfaces 44 of the flange portion 30 of each rib 26 also are moderately concave in cross-section, but that the width dimension (illustrated at "b") is greater than the width dimension of the web portion 28. Thus, the cross-sectional configuration of the rib 26 is, in terms of function, an I-beam, where the adjacent portion of the sheet 16 forms one flange of the I-beam, and the flange 30 is positioned on the opposite side of the web portion 28.

At this point, to appreciate some of the novel features of the present invention, it would be of benefit to pause and examine how a single panel section 12 or 14, by itself, functions in structural strength. The ribs 26 and the edge portion 20 act as stiffening members, and function to resist bending moments and other stresses placed on the panel sections 12. The ribs 26 function essentially as I-beams. Let us assume, for example, that the panel section as shown in FIG. 1 is stressed so that two opposite sides of the edge portions 20 are pushed downwardly, while the center portion of the panel section 12 remains stationary. The effect of this would be that the ribs 26 which extend between the two edge sections which are being pushed downwardly will react to resist this bending in a manner that the flange portion 30 of each of these ribs 26 will react in tension, while the rib portion adjoining the sheet 16 along with adjoining portions of the sheet 16 will react in compression to resist the bending moments. Thus, each rib 26 does in fact act as an beam to provide flexural strength and stiffness to the individual panel section 12.

With the foregoing in mind, let us now review the manner in which the assembled panel structure 10 of the present invention reacts under loading. As indicated previously the two panel sections 12 and 14 are bonded one to another at the bonding faces 32 and 36. With reference to FIG. 4, it will be noted that each pair of upper and lower ribs 26 that are bonded to one another, now reacts essentially as a single beam. Let us assume that this combined beam (made up of the upper and lower ribs 26) is subjected to a bending moment to bend the panel 10 out of its planar configuration so that the two opposite perimeter portions are pushed downwardly. The result is that the upper sheet section 16 is placed in tension, while the lower sheet section 16 is placed in compression. It will be noted that the bond line (or more precisely a bonding plane) located at 21 is in close proximity to the neutral axis of the beam 26—26 made up of the two ribs 26 that are bonded to one another. Thus, the material at the bond line 52 is not subjected to any significant tension or compression loads, but is subjected primarily to shear stresses.

The result is that if there is some weakness or inconsistency at the bonding surfaces 32 or 36, this would have relatively less effect in diminishing the ability of the combined panel structure 10 to resist such loading. Further, since the bonding faces 32 of the two ribs 26 are larger in cross section area than the web portions 28 (because of the greater planar area of the flange portions 30), the bonding mechanism may have lesser strength than the parent material, without reducing the structural capacity of the panel.

To appreciate more fully the benefits of the present invention, it should be pointed out that in a more conventional sandwich structure, such as honeycomb, there are generally two sheet or skin sections which are bonded to opposite sides of the core. Thus, for example, in the case of a honeycomb panel, the areas subjected to the greatest amount of stress are those where the bonding takes place. On the other hand, in the present invention, since each of the two panel sections 12 and 14 are made as integral members, each of these ribs 26 is formed integrally with it adjacent sheets 16. As indicated above, the bonding is accomplished at the area which is normally subjected to the least stress.

To demonstrate the effectiveness of the panel 10 of the present invention, three different panel sections were designed, each of which had a rectangular configuration with a 40 inch length and a 20-inch width, and a core thickness dimension of one half inch. The weight of each of the three panel sections was the same. Further, each of these was designed so that the flexural stiffness was optimized. It should be noted that of such panels or similar structures in aerospace applications are commonly subjected to compression loads. One possible reason for this is that such aerospace structures are subjected to temperature changes which cause the structure to expand or contract, thus subjecting these structures to compression loads that would tend to cause the panels to buckle. Flexural stiffness of a panel is an important characteristic in determining its resistance to buckling. Also, it should be noted that the stiffness of the panel is directly related to the ability to withstand bending loads which would tend to deform the panel from its normal configuration.

The first panel was designed as an isogrid structure and is essentially quite similar in structure to one of the individual panels 12 or 14, as shown in FIG. 1 of the present invention. The second panel was a honeycomb panel designed in accordance with preferred prior art honeycomb design criteria. The third panel was designed in accordance with the present invention. As indicated above the three panels were designed to have the same size and weight. The flexural stiffness of these three panels was calculated and is shown below.

|  | Unit Flexural Stiffness - in. $^2$/in. |
|---|---|
| Panel 1 | 21,627 |
| Panel 2 | 61,868 |

-continued

|  | Unit Flexural Stiffness - in. $^2$/in. |
|---|---|
| Panel 3 | 72,619 |

The increased flexural stiffness of the panel 10 of the present invention (Panel 3 in the table) provides greater structural capability in comparison to prior art.

At this point, it should also be noted that in addition to having greater structural capacity in comparison with a prior art honeycomb panel, the panel 10 of the present invention does not suffer from many of the disadvantages which were cited earlier with regard to honeycomb panels.

Figure 8:
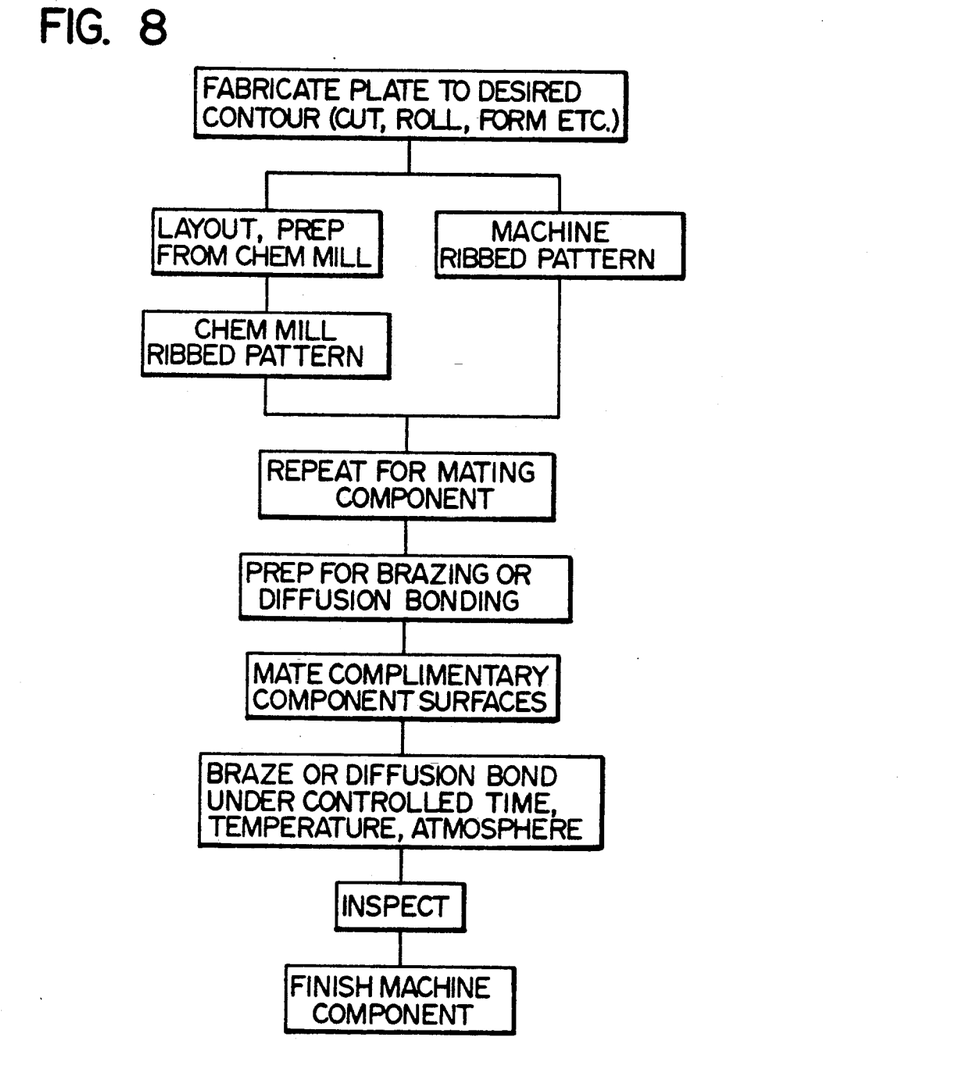
FIG. 8 illustrates the steps in manufacturing the panel structure of the present invention.

To describe the method of the present invention, reference is now made to FIG. 8. The first step is to begin with a blank plate which is fabricated to the desired configuration and contour. This could be accomplished by cutting the plates to the desired configuration; also it would be possible to roll it to a curved shape if desired, or otherwise forming it. Then this blank is treated to form it into one panel section 12. This can be accomplished by the chemical milling techniques described in the U.S. Patents mentioned earlier herein. Alternatively, other machining methods could be used to form the panel section 12. Then the second mating section 14 is manufactured in substantially the same manner.

The two panel sections are then prepared for a bonding operation, and this of course will vary depending upon the bonding operation used. The bonding surfaces 32 and 36 should be appropriately cleaned. This could be accomplished by grinding and subsequent flash-etch chem milling. Alternatively, an electrochemical milling process could be used. Depending on the alloy or material comprising the component sections, an inter-layer could be used in the bonding process, or this bonding could be accomplished by solid state diffusion bonding. The two panel sections 12 and 14 are properly aligned and placed against one another, with mating bonding faces 32 and 36 being positioned against one another. It should be recognized that tooling is required to hold the mating sections in proper alignment. Then pressure is applied to the outside surfaces 22 to provide the appropriate bonding pressure sufficient to create a true metallurgical bond. During the bonding cycle, a back pressure of argon or some other clean, inert gas is created within the structure formed by the two panel sections 12 and 14 to prevent crushing during the bonding cycle of the two panel sections 12 and 14 between the ribs. The pressure used to accomplish the bonding will vary.

The finished structure has certain desirable features, some of which have been discussed previously herein. For example, problems of fatigue are substantially alleviated because of the location of the bonding area at or near the neutral axis. Also, the panel structure 10 is less susceptible to thermal problems. In applications in which a substantial temperature difference occurs from one side of a panel to the other, a thermal gradient is developed across the panel section. For typical honeycomb core panel structures, the thermal gradient tends to be greatest at the bonded interface between the core and the face. For panels of the present invention, the thermal gradient at the rib 26 to face 16 is minimized by the shape transition of the rib 26. Additionally the rib 26 is integral with the face 16 at the location of the greatest thermal gradient, thus having greater structural capacity. The panel structure 12 could be made of various materials, such as aluminum, nickel, titanium and alloys incorporating these metals. The dimensions of course could vary, depending upon the application. In a typical application, the sheet portion 16 could have a thickness dimension of possibly 0.020 inch, or possibly less. The rib height will vary, and this of course depends to some extent upon the feasibility of rib height relative to manufacturing techniques.

Figure 5:
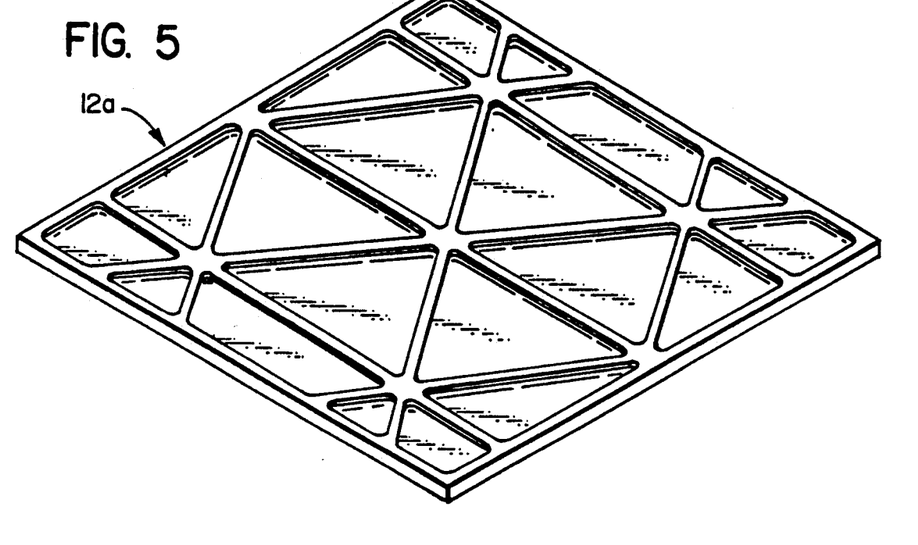
FIG. 5 is an isometric view similar to FIG. 1, but showing a first panel section used in forming a panel structure of a second embodiment of the present invention.
Figure 6:
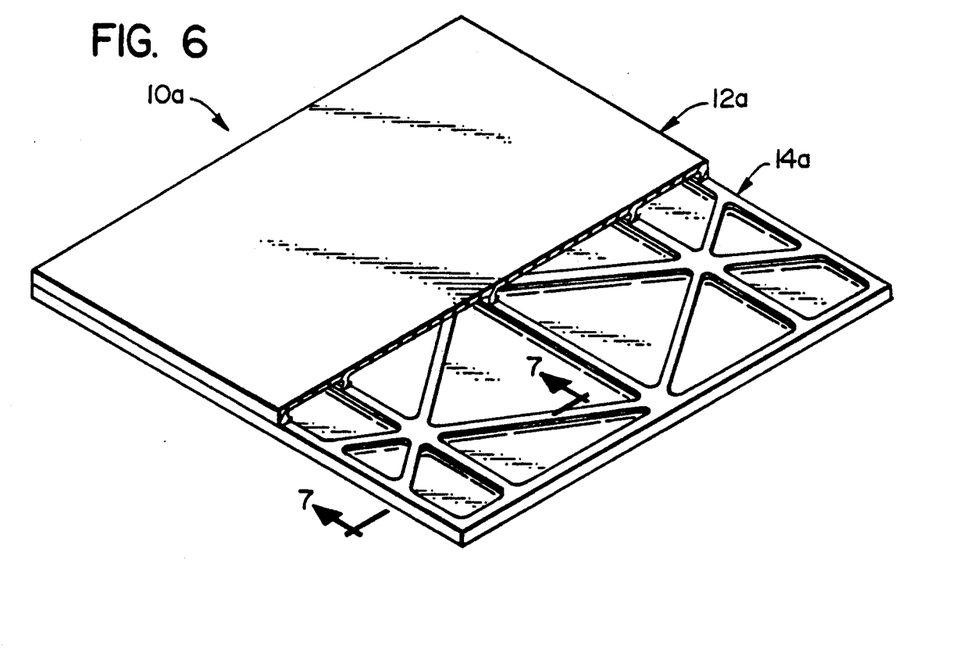
FIG. 6 is a view similar to FIG. 2, showing the two panel sections being joined to one another to form the second embodiment of the present invention.
Figure 7:
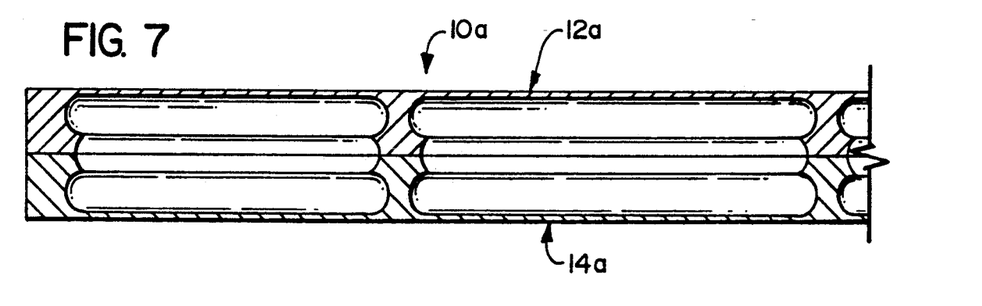
FIG. 7 is a sectional view taken along line 7—7 of FIG. 6.

A second embodiment of the present invention is illustrated in FIGS. 5, 6 and 7. The second embodiment differs from the first embodiment simply in the configuration of the pattern of the ribs. It will be noted that instead of having a rectangular rib pattern, the ribs of the second embodiment are formed in a triangular pattern. Accordingly, there will not be a detailed description of this second embodiment. Rather, numerical designations of components of the first embodiment will be given to similar components of the second embodiment with an "a" suffix distinguishing those of the second embodiment.

Figure 9:
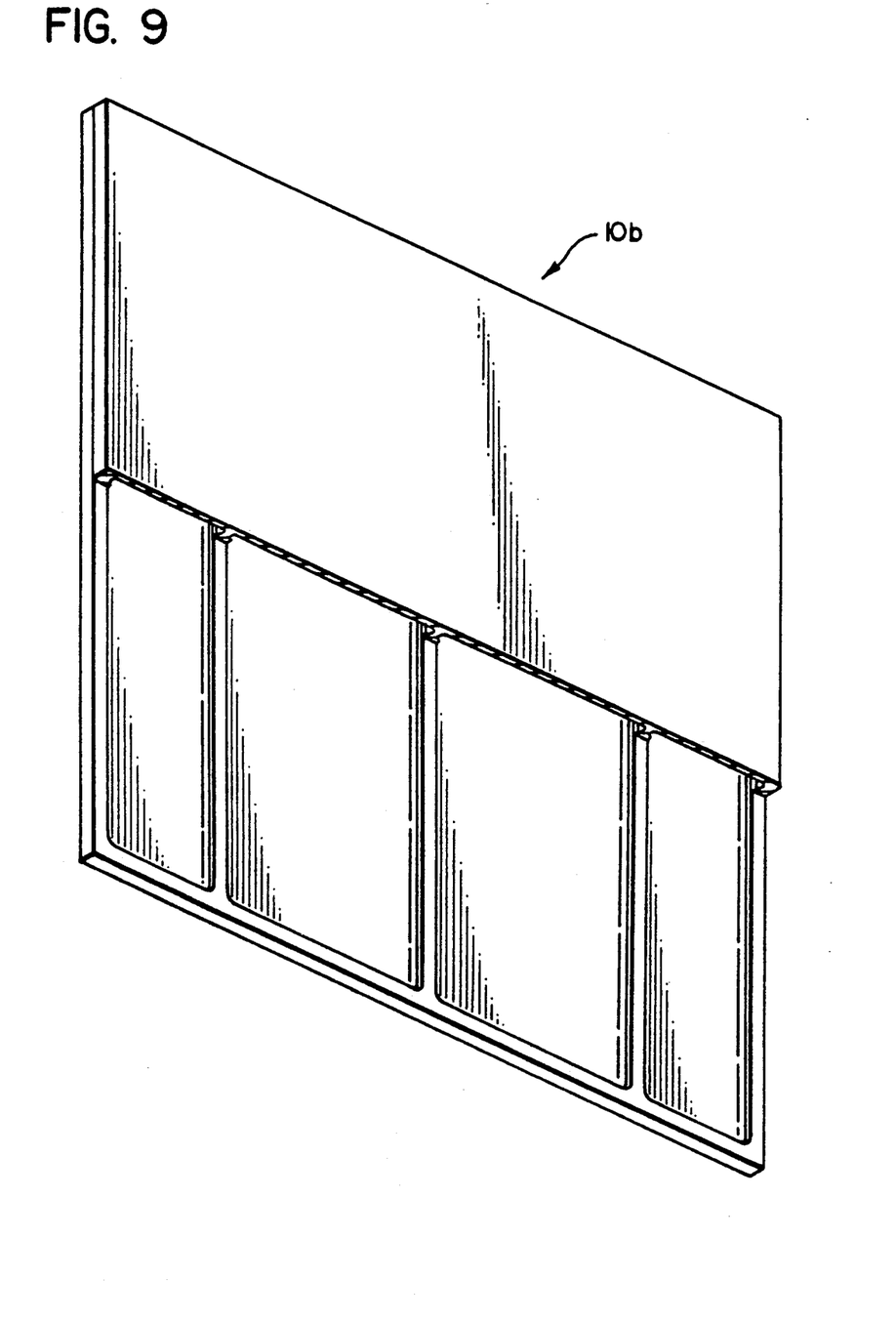
FIG. 9 is an isometric view similar to FIG. 6, showing the two panel sections being joined to one another to form a third embodiment or the present invention.

A third embodiment of the present invention is illustrated in FIG. 9. The third embodiment differs from the first embodiment by having a parallel rib configuration in place of the rectangular rib configuration. This third embodiment is designated 10b, and it is believed that the structure and function of this third embodiment are evident from the description of the prior two embodiments. Accordingly, no detailed description will be presented herein.

Figures 11, 12:
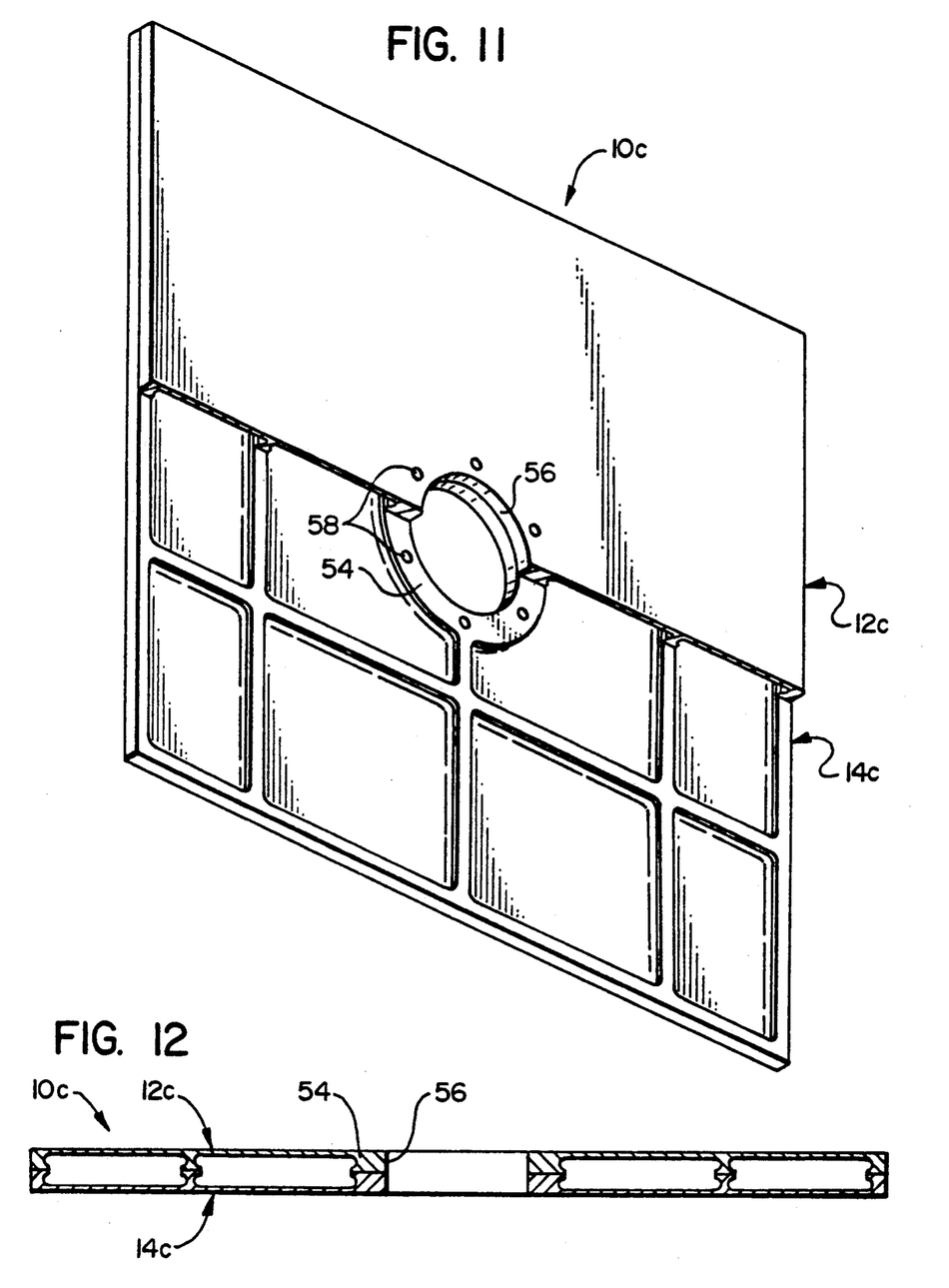
FIG. 11 is a view similar to FIG. 2, showing the structure of the fourth embodiment of the present invention with the second integral panel section being bonded to the first panel section of FIG. 10, with the portions of the second upper panel section being removed for purposes of illustration, and with a central opening and peripheral fastener openings formed in the boss.
FIG. 12 is a sectional view taken through the center of the structure of FIG. 11, perpendicular to the plane of the structure.

A fourth embodiment of the present invention is illustrated in FIGS. 10, 11 and 12, and is designated 10c. The fourth embodiment differs from the previous embodiments by the incorporation in the structure of one or more integral bosses 54 to facilitate attachment of accessory components to the structure. Bosses can be incorporated into the structure without regard to rib pattern or to the bonding plane. As shown herein, this boss 54 has a circular configuration with a central through opening 56, and peripheral fastening holes 58. In FIG. 10 one panel section 12c is shown prior to being joined to the second panel section and prior to having the holes 56 and 58 formed therein.

Figure 13:
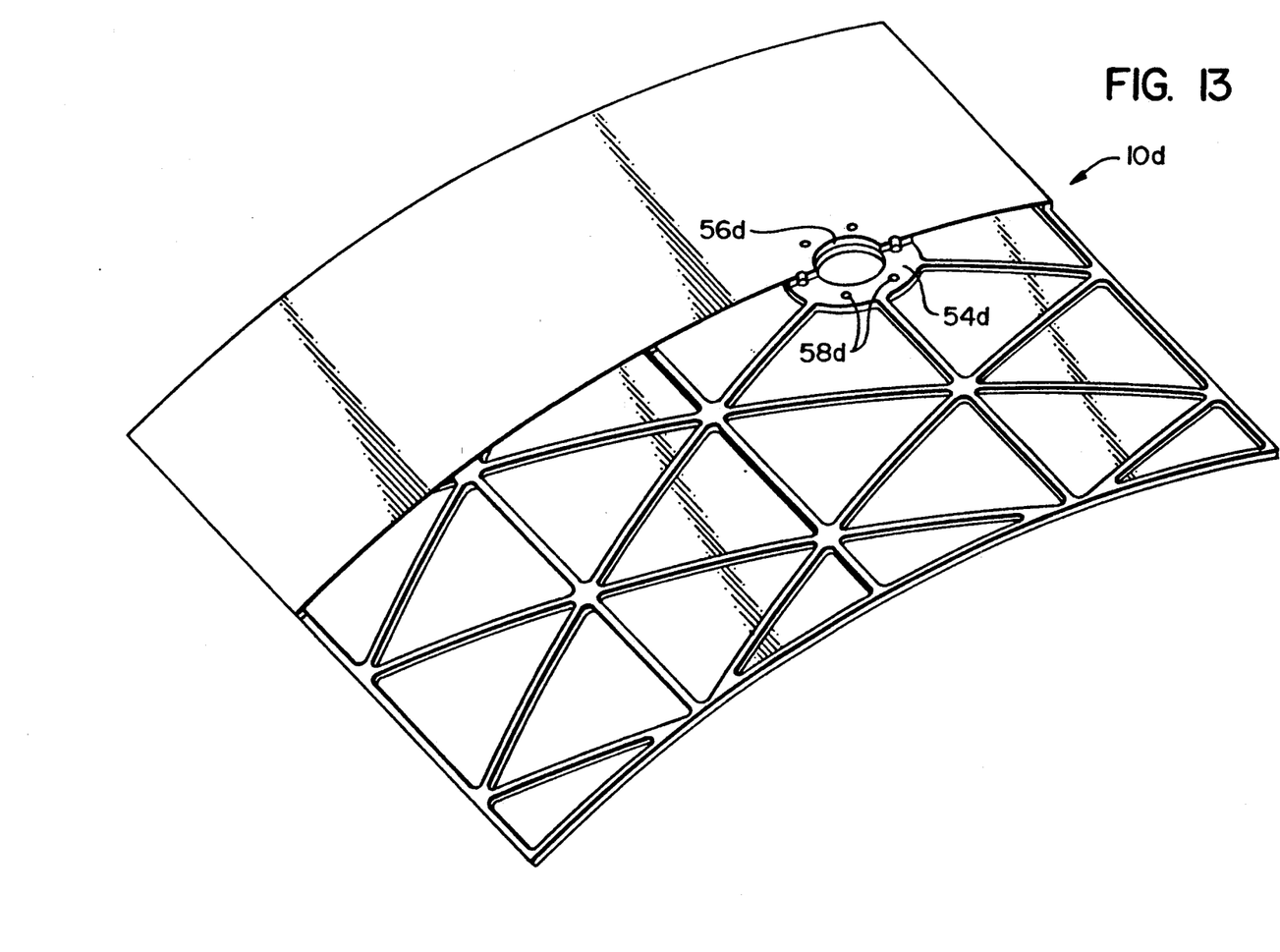
FIG. 13 is a view similar to FIG. 2 and shows a fifth embodiment where there is an integral boss and the panel structure has a curved configuration. Add in the Figure description.

A fifth embodiment is shown in FIG. 13. FIG. 13 is quite similar to FIG. 11, except that there is a triangular configuration as shown in FIGS. 5 and 6, and also except for the fact that the panel structure has a curved configuration. It is believed that the structure and function of this fifth embodiment of FIG. 13 is evident from reviewing the earlier descriptions herein, so no further description will be added. Rather, a "d" suffix will be added to distinguish the components of this fifth embodiment.

Figure 14:
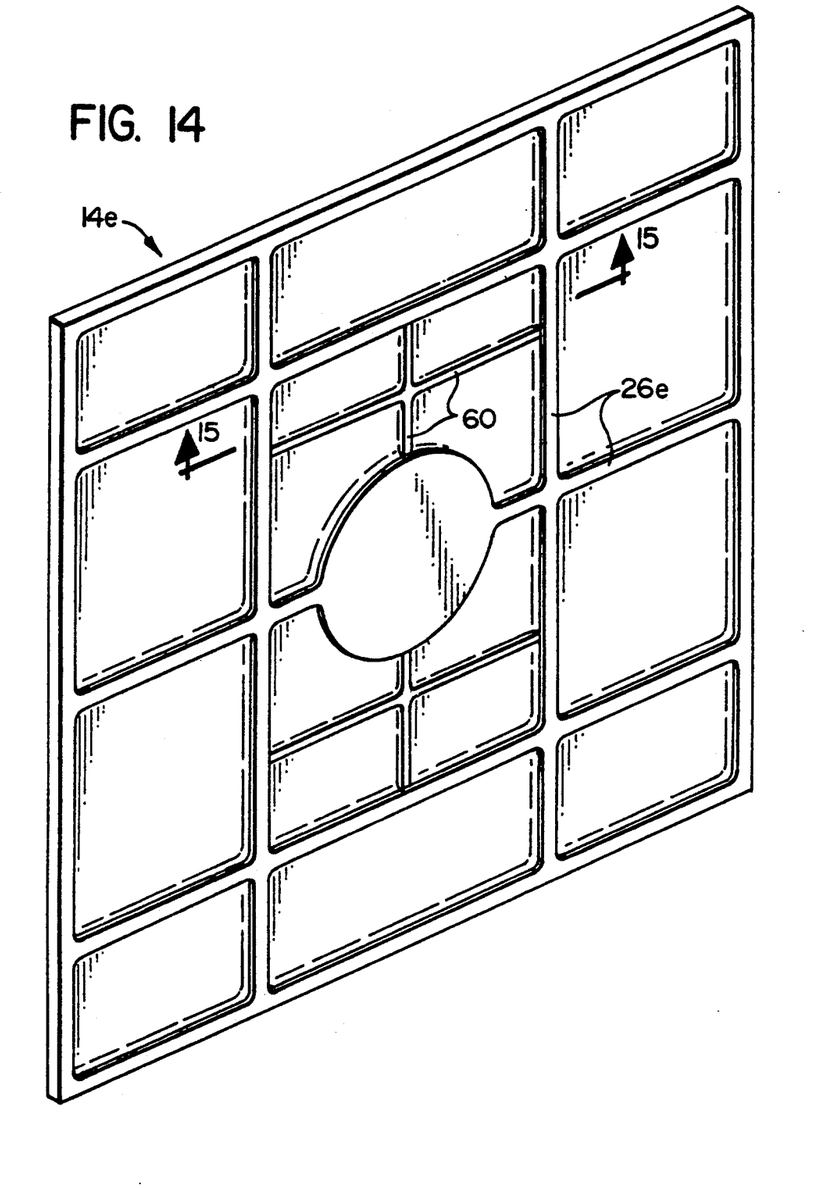
FIG. 14 is an isometric view of a single first panel section which is joined to a substantially similar (or identical) second panel section to form a sixth embodiment.
Figure 15:
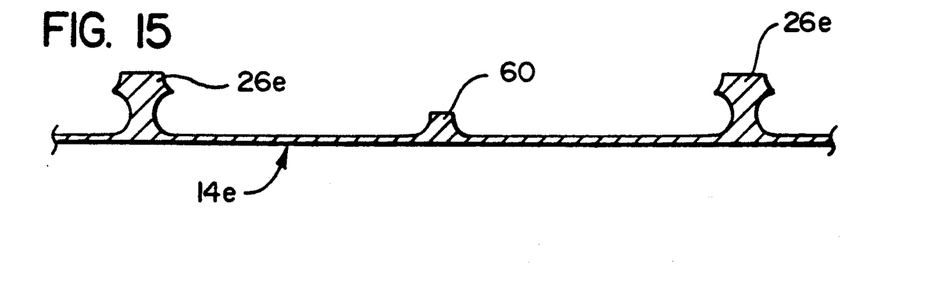
FIG. 15 is a cross-sectional view of a fifth embodiment of the present invention wherein secondary ribs are incorporated in the structure.

Finally a sixth embodiment is shown in FIGS. 14 and 15. FIG. 14 shows only a single panel, and this is formed with a central boss in the same manner as shown in FIG. 10. This sixth embodiment will be given numerical designation similar to the prior embodiments, with an "e" suffix distinguishing those of this sixth embodiment.

Only one panel section 14e is shown in FIG. 14, it being understood that this is to be joined to a similar panel to make a panel structure as to the prior embodiments. This sixth embodiment is distinguished in that in addition to the primary ribs 26e, there are provided secondary ribs 60 (see FIG. 15 which is a sectional view.) These ribs 60 are of a lower height dimension than the primary ribs 26c, and thus opposing secondary ribs 60 from the panel sections joined to one another have a gap therebetween and are not bonded to one another. These secondary ribs 60 are primarily for stiffening.

It is to be recognized that various modifications and changes could be made to the present invention without departing from the basic teachings thereof.

What is claimed is:

1. A structure comprising:
   a. a first integrally formed flat or contoured panel section comprising:
      i. an outer first sheet portion having outer and inner surfaces;
      ii. a first rib portion comprising a plurality of first elongate ribs arranged in a first predetermined pattern extending along said first sheet portion and formed integrally with said first sheet portion, each first rib having an outer first rib portion joined integrally to said first sheet portion and an inner first rib portion spaced inwardly from said first rib portion spaced inwardly from said first sheet portion and having an inwardly facing first bonding surface;
   b. a second integrally formed flat or contoured mating panel section comprising:
      i. an outer second sheet portion having outer and inner surfaces;
      ii. a second rib portion comprising a plurality of second elongate ribs arranged in a second predetermined pattern corresponding to said first predetermined pattern, and extending along said second sheet portion and formed integrally with said second sheet portion, each second rib having an outer second rib portion joined integrally to said second sheet portion and an inner second rib portion spaced from said second sheet portion and having a second inwardly facing second bonding surface;
   c. said first and second panel sections being portioned with the first and second bonding surfaces of the first and second ribs being positioned against one another and metallurgically bonded to one another at bonding locations located between said first and second sheet portions, so as to form a rigid structure, whereby as loads are imposed upon said structure so as to place said first and second skin portions in compression or tension, the bonding locations of the first and second ribs are closer to a neutral axis of said structure relative to withstanding such loads.

2. The structure as recited in claim 1, wherein the inner portions of said first and second ribs have a lateral rib dimension greater than lateral thickness dimensions of intermediate portion of each of said first and second ribs.

3. The structure as recited in claim 2, wherein the first and second bonding surfaces of said first and second ribs each have a lateral width dimension greater than the lateral width dimensions of the intermediate portions of the first and second ribs, whereby bonding area of said first and second bonding surfaces is over a relatively large area.

4. The structure as recited in claim 3, wherein said first and second ribs are each arranged in a crossing pattern.

5. The structure as recited in claim 4, wherein said first and second ribs are arranged in a rectangular crossing pattern.

6. The structure as recited in claim 4, wherein said first and second ribs are arranged in a crossing triangular pattern.

7. The structure as recited in claim 1, wherein said first and second ribs are arranged in a parallel pattern.

8. The structure as recited in claim 4, wherein each of said first and second panel sections has first and second perimeter portions having first and second perimeter bonding surfaces, respectfully, positioned adjacent to one another and bonded to one another, with the first and second bonding surfaces of the first and second perimeter sections being positioned at a location between said first and second sheet portions.

9. The structure as recited in claim 1, wherein each of said first and second panel sections has first and second perimeter portions having first and second perimeter bonding surfaces, respectfully, positioned adjacent to one another and bonded to one another, with the first and second bonding surfaces of the first and second perimeter sections being positioned at a location between said first and second sheet portions.

10. The structure as recited in claim 1, wherein an integral boss is incorporated in the structure to facilitate the attachment of accessories.

11. The structure as recited in claim 3, wherein an integral boss is incorporated in the structure to facilitate attachment of accessories.

12. The structure as recited in claim 1, wherein said bonding locations are located in a region proximate to a neutral axis of said structure.

13. The structure as recited in claim 3, wherein said bonding locations are located in a region proximate to a neutral axis of said structure.

14. The structure as recited in claim 4, wherein said bonding locations are located in a region proximate to a neutral axis of said structure.

15. The structure as recited in claim 7, wherein said bonding locations are located in a region proximate to a neutral axis of said structure.

16. The structure as recited in claim 11, wherein an integral boss is incorporated in the structure.

17. The structure as recited in claim 12, wherein an integral boss is incorporated in the structure.

18. The structure as recited in claim 13, wherein an integral boss is incorporated in the structure.

19. The structure as recited in claim 1, wherein said structure has secondary ribs formed in at least one of said sheet portions.

20. The structure as recited in claim 3, wherein said structure has secondary ribs formed in at least one of said sheet portions.

21. The structure as recited in claim 4, wherein said structure has secondary ribs formed in at least one of said sheet portions.

* * * * *